No. 873,839. PATENTED DEC. 17, 1907.
L. CAPUTO.
AUTOMATIC SIGNALING DEVICE.
APPLICATION FILED AUG. 23, 1907.

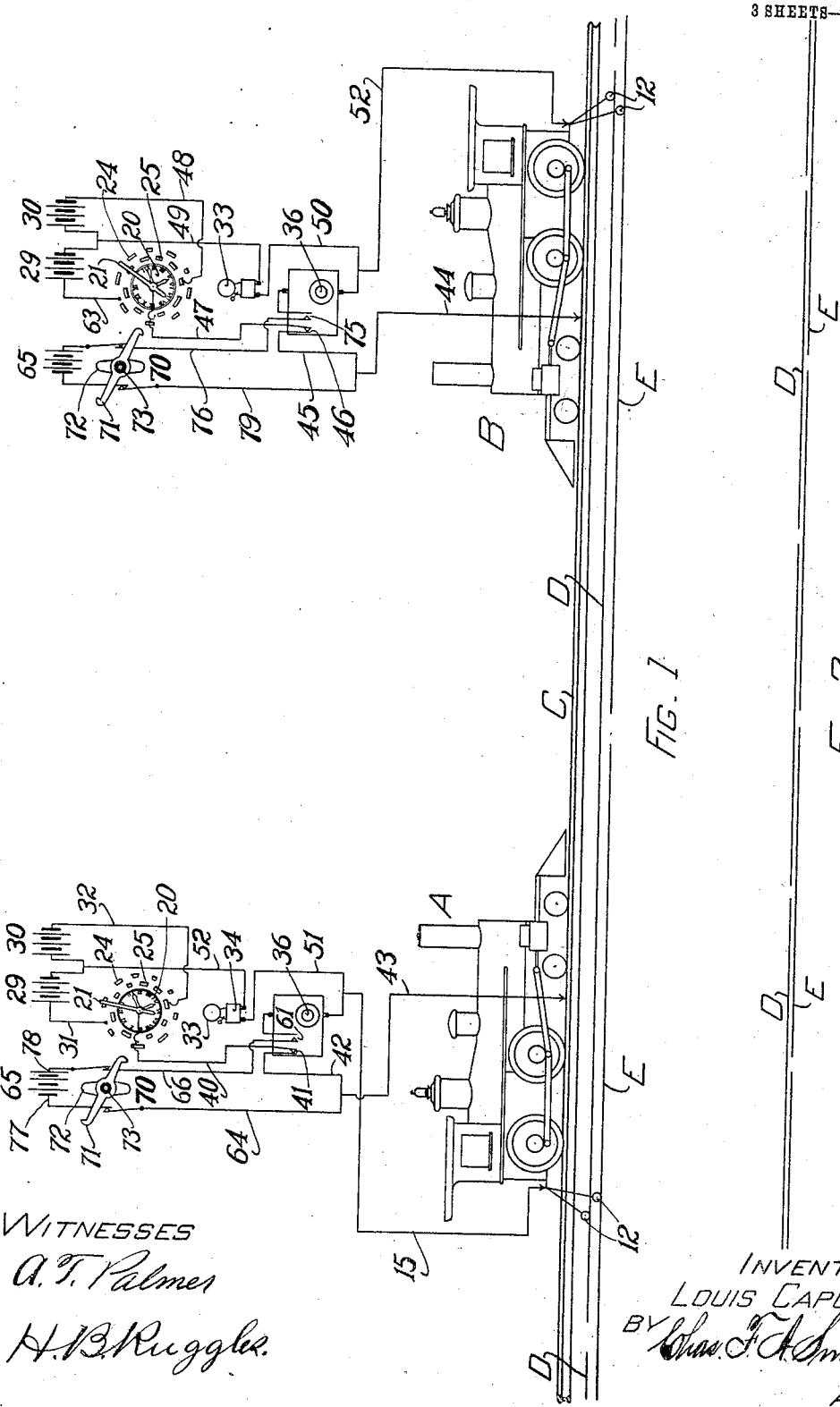

3 SHEETS—SHEET 2.

WITNESSES
A. T. Palmer
H. B. Ruggles

INVENTOR
LOUIS CAPUTO
BY Chas. F. A. Smith
ATTY.

No. 873,839. PATENTED DEC. 17, 1907.
L. CAPUTO.
AUTOMATIC SIGNALING DEVICE.
APPLICATION FILED AUG. 23, 1907.

3 SHEETS—SHEET 3.

WITNESSES
A. T. Palmer
H. B. Ruggles

INVENTOR
LOUIS CAPUTO
BY Chas. F. H. Smith
ATTY.

UNITED STATES PATENT OFFICE.

LOUIS CAPUTO, OF EAST BOSTON, MASSACHUSETTS.

AUTOMATIC SIGNALING DEVICE.

No. 873,839.  Specification of Letters Patent.  Patented Dec. 17, 1907.

Application filed August 23, 1907. Serial No. 389,853.

*To all whom it may concern:*

Be it known that I, LOUIS CAPUTO, a citizen of the United States, residing at East Boston, in the county of Suffolk and State of Massachusetts, have invented certain new and useful Improvements in Automatic Signaling Devices, of which the following is a specification, reference being had therein to the accompanying drawings.
This invention relates to automatic signaling devices adapted for use on railways and has for its object the prevention of collisions,—either head-on or rear-end.

The fundamental principle consists of a series of alternating track wires which are electrically connected with signaling devices placed in locomotive cabs or other moving vehicles so that when two of said vehicles are on the same track wire, automatic signals are sounded in each.

I prefer to provide, in addition to the signaling device, a telephone system which will enable the car operators to converse and ascertain the exact nature of the threatened trouble.

Figure 3:
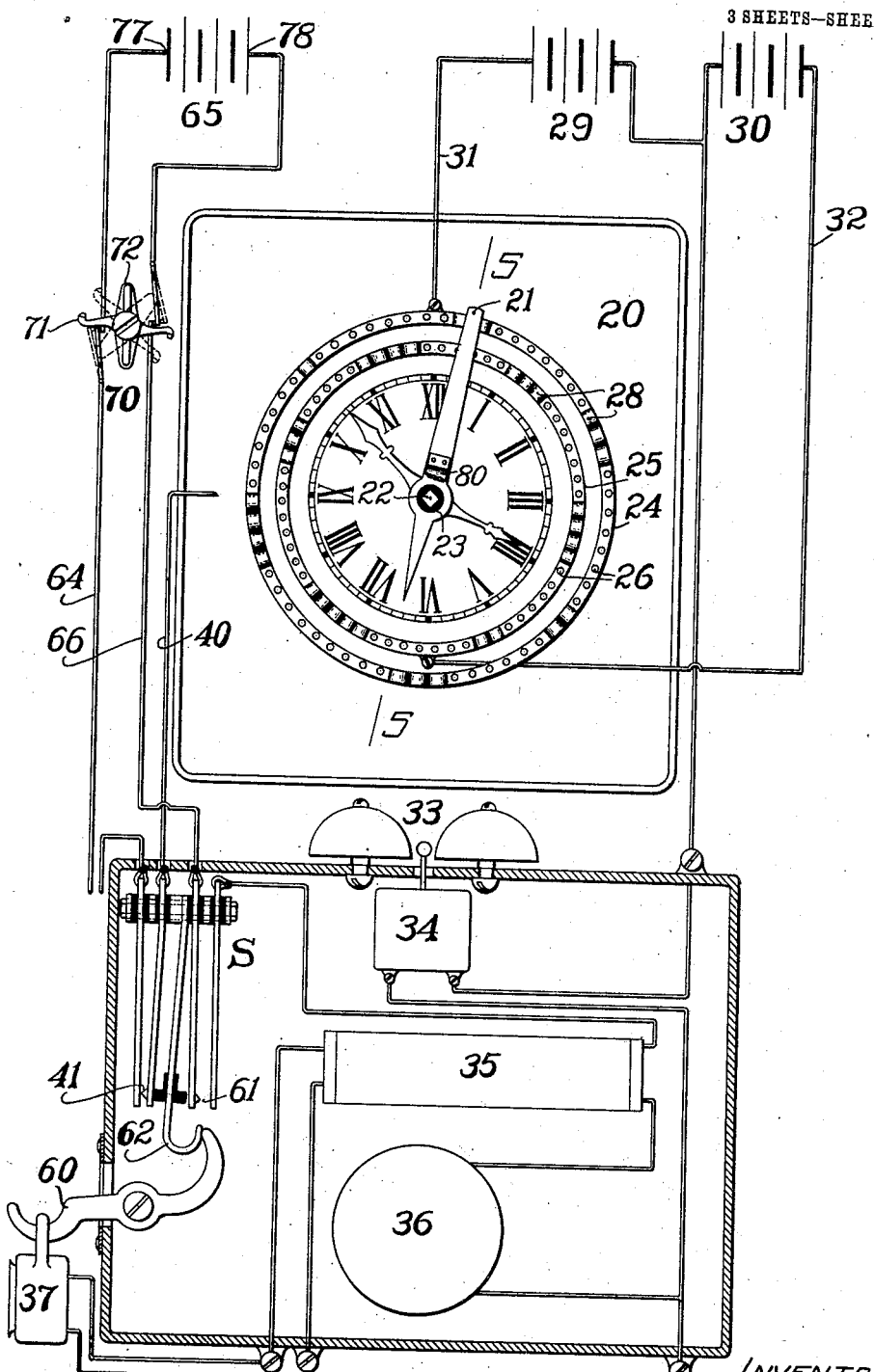
Figure 4:
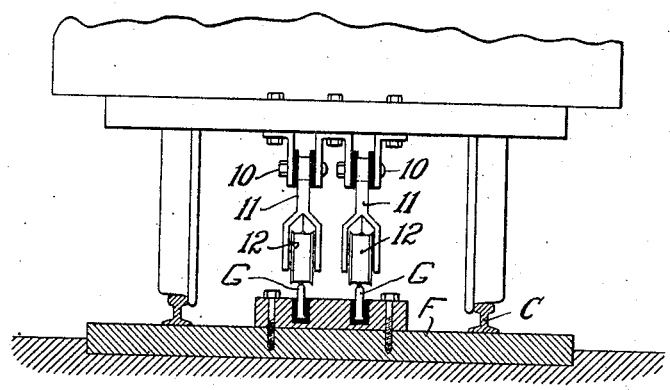
Figure 5:
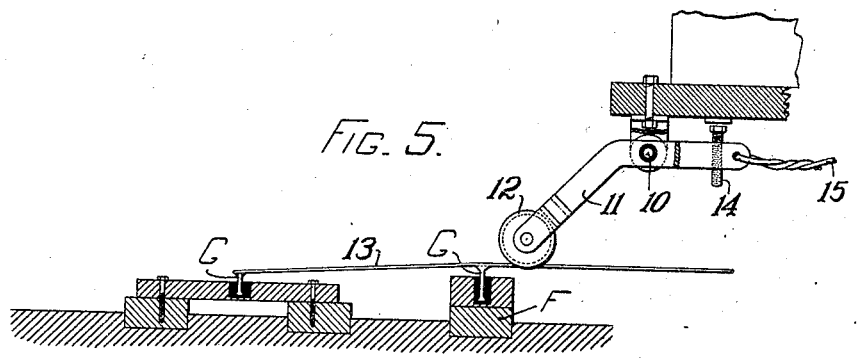
Figure 6:
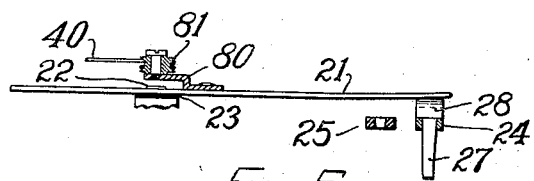

In the drawings, which form part of this specification,—Figure 1 is a diagram representing two approaching locomotives on the same track with the signaling and talking devices indicated in enlarged outline above. Fig. 2 represents the arrangement of the track wires. Fig. 3 represents one of the signaling devices. Fig. 4 shows a rear view of a portion of a car illustrating the arrangement of the trailers. Fig. 5 represents a side view of what is shown in Fig. 4. Fig. 6 shows, in partial section on line 5—5 of Fig. 3, the magnetic arm on the clock.

A and B represent approaching locomotives on a single track C, both being within the limits of the same track wire D. The track wires D and E are of any suitable length, supported in alternated position (see Fig. 2) between the rails of track C. They are preferably supported on the track ties F by means of insulated supports G G. (Figs. 4 and 5).

To the frame of the vehicle (A or B) I attach pivotally at 10 trolley arms 11, 11 insulated therefrom and carrying trolley wheels 12, 12 adapted to rest on track wires D and E. Wheels 12 have a broad tread to permit of the necessary play when rounding curves. They are here shown as resting on the track wires by gravity, although spring action can be employed if desired. The ends of the track wires D and E are depressed as shown at 13, Fig. 5, to permit easy approach of the trolley wheels, and adjustable means, as the bolt 14, maintains the wheel in proper elevation when bridging the space between two track wires. Wire 15 connects the trolleys with the signaling device in the cab.

Referring to Figs. 1 and 3, my signaling device will be described as follows:—The numeral 20 represents a clock of ordinary construction except that the second hand 21 is constructed differently and for a special purpose, being insulated from the clock spindle 22, as shown in Figs. 3 and 6, at 23. Surrounding the clock dial are two metal rings 24 and 25, each provided with a series of equally spaced perforations 26 adapted to receive frictionally the shanks 27 of plugs 28. This arrangement permits of varied combinations of plugs 28 for a purpose presently to be explained. These rings 24 and 25 are respectively connected to batteries 29 and 30 by means of wires 31 and 32. Below clock 20 I prefer to locate a signaling apparatus which is here shown in the form of a complete telephone, comprising the bells 33, their magnet 34, induction coil 35, transmitter 36 and receiver 37. Of these, only the first two are needed for signaling purposes, and the rest may be omitted where the telephone feature is not desired. It is desirable that every engine shall be similarly equipped and that this equipment shall automatically cause signaling in both of any two engines that may get on the same track wire. It is therefore necessary to provide for change in polarity in each engine circuit, in order to insure completion of same by said track wire. This is accomplished by the two batteries 29 and 30 and also by varying the combinations of plugs 28. To insure this change of polarity, the second hand 21 in one engine must be in electrical contact with ring 24 when the other engine has its hand 21 in electrical contact with ring 25. It is evident that if plugs 28 were combined similarly in both engines they might permit complete revolution of second-hands 21 without producing the required change of polarity; consequently each clock 20 must have a different arrangement of plugs 28 in rings 24 and 25 answering to the various combinations of a safe clock. A series of switches are shown within the telephone box at S (Fig. 3) which are necessary to the telephone system but could be omitted otherwise.

Referring to Fig. 1, engines A and B are shown on the same track wire D and in ringing connection. The circuits can be traced as follows:—From the copper of battery 29, engine A, through wire 31 to ring 24, thence by second-hand 21 to wire 40 to contact 41, wire 42, wire 43 to rail of track C and thus to engine B, thence by wire 44 and wire 45, contact 46, wire 47 to second-hand 21, ring 25, wire 48, battery 30, wire 49, bells 33, wire 50, wire 52, trolley wheel 12, track wire D back to engine A, thence by trolley wheel 12, wire 15, wire 51, to bells 33, wire 52 to zinc of battery 29. If engine A was connected to ring 25 and B to ring 24, the circuit could be similarly traced, beginning at engine B. The peculiar functions of batteries 29 and 30 are thus illustrated, and I attach great importance to this feature. By arranging them in series, either one is automatically brought into action without affecting the other. The circuit traced above will cause both bells to ring, and an alarm is sounded every time the two second-hands 21 are dissimilarly engaged by rings 24 and 25. The ringing can be stopped by breaking either contact 41 or 46. Where the telephone system is installed, the ringing of the bells would act as an ordinary telephone call. Each engine-driver would take his receiver 37 from its hook 60, thus cutting out his own bells, by breaking the contacts 41 or 46.

By a study of Fig. 1 it will be seen that when engine A lifts its receiver, engine B's bell will continue to ring by the following circuit, remembering that the lifting of A's receiver breaks contact 41 and makes contact 61, due to the spring action of bar 62, which is engaged by the inner end of hook 60:—From the copper of battery 29, by wire 63 engine B to ring 24, second-hand 21, wire 47, contact 46, wire 45, wire 44, track C, wire 43 (engine A), wire 64, battery 65, wire 66, contact 61 to transmitter 36, thence by wire 15 to wheel 12, track wire D to engine B, thence by wire 52, wire 50 to bells 33 and wire 49 to the zinc of battery 29 in engine B. When B lifts its receiver, both bells are out of circuit and a talking circuit is ready to be established. In the drawings, but one talking battery 65 is shown for each engine. A similar arrangement to that for the bells could be installed, employing a second battery and clock; but I prefer to provide other means for obtaining change of polarity in the talking circuit, and for this purpose I interpolate a switch 70 which will preferably be operated by hand to change the pole connections of one of the batteries 65. If A and B should operate their switches simultaneously, of course no result would be obtained, but that would rarely happen and when the talking circuit is established, neither would further manipulate his switch until they "rang off".

The two positions of switch 70 are shown in Fig. 3 by the full and dotted lines, arms 71 and 72 being insulated from each other by insulations 73 shown in Fig. 1. When the talking circuit is established, conversation takes place over the following circuit, remembering that contacts 41 and 46 are broken and contacts 61 and 75 are made, and that A's switch only is turned to the dotted position shown in Fig. 3. From the copper of B's battery 65, wire 76, contact 75, to transmitter 36, wire 52 to wheel 12 and track wire D to engine A; thence by wire 15 to transmitter 36, contact 61, wire 66, switch arm 71 to the zinc 77 of battery 65; thence from the copper 78 of battery 65 to switch arm 72 to wire 64, wire 43 to track C to engine B; thence by wire 44, and wire 79 to the zinc of battery 65.

Fig. 6 shows the method of connecting wire 40 to second hand 21. A bracket 80 carries a roll 81 pivoted over the dial center, around which wire 40 is secured.

It is to be understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features and details of construction illustrated.

I claim as my invention:—

1. An automatic signaling apparatus consisting of signaling devices to be carried by moving vehicles, a track upon which said vehicles are adapted to run, means for connecting the signaling devices, and a clock carried by each signaling device whereby automatic signals are sounded in each of the vehicles on any one section of the track.

2. An automatic signaling apparatus consisting of signaling devices to be carried by vehicles, a track upon which said vehicles are adapted to run, alternating track wires electrically connected with said signaling devices, and a clock carried by each signaling device whereby automatic signals are sounded in each of the vehicles on the same track wire.

3. The combination with a track and moving vehicles thereon of signaling devices carried by said vehicles, each signaling device provided with a clock having a second hand 21, two metal rings 24, 25 surrounding its dial each provided with a series of equally spaced perforations, plugs 28 adapted to have their shanks frictionally held in said perforations, and the plugs arranged to varied combinations, and means for connecting the signaling devices of any two vehicles on any section of the track whereby automatic signals are sounded in each of said two vehicles when the second hand has reached certain plugs.

4. An automatic signaling apparatus consisting of a track, vehicles adapted to move upon said track, each vehicle provided with two or more batteries, a clock, a signaling device and a telephone, means for connecting the batteries with the clocks, signaling devices and telephones, alternating track wires, and means connecting the batteries, clocks, signaling devices and telephones with the track and track wires.

5. An automatic signaling apparatus consisting of signaling devices to be carried by vehicles, a track upon which said vehicles are adapted to run, a clock carried by each signaling device, alternating track wires electrically connected with said signaling devices so that when two of said vehicles are on the same track wire automatic signals are sounded in each, and a telephone system connected with the signaling devices which will enable the operators in said two vehicles to converse.

6. An automatic signaling apparatus consisting of a track, locomotive cabs adapted to move over said track, alternating track wires, each cab provided with a signaling apparatus, a clock carried by each signaling apparatus within each locomotive, a battery, means connecting the signaling apparatus and battery, and means connecting them with the track and track wires.

7. An automatic signaling apparatus consisting of a track, locomotives adapted to move over said track, alternating track wires, each locomotive provided with a telephone and signaling apparatus, each signaling apparatus provided with a clock within the locomotive, batteries, wiring connecting the batteries and telephone and signaling apparatus, means connecting the telephone and signaling apparatus with the track wires, and means connecting the telephone and one of the batteries with the track.

8. An automatic signaling apparatus consisting of a track, locomotives adapted to move over said track, alternating track wires D, E, signaling apparatus upon the locomotive as follows, a clock 20 provided with a second hand 21, a clock spindle 22, insulation 23 between the second hand and spindle, an outer metal ring 24, an inner metal ring 25, a series of plugs 28 adapted to be arranged in varied combinations around the rings and having their shanks frictionally held in perforations in the rings, batteries 29, 30 and 65, a wire 31 connected between the copper of battery 29 and the outer ring 24, a contact 41, a wire 40 connecting second hand and contact, means connecting contact 41 with the track, a wire 32 connecting ring 25 with battery 30, wiring connecting batteries 29 and 30 with each other, ringing apparatus 34, wiring connecting the batteries 29, 30 with the ringing box, wiring connecting the ringing box with a contact 61; wiring 66 connecting the battery 65 with contact 61, wiring 64 connecting battery 65 with contact 41 and the track, a spring bar 62, hook 60, a telephone apparatus having a receiver adapted to rest upon the hook, and wiring connecting the telephone apparatus and track wires, substantially as shown and described.

In testimony whereof I affix my signature in presence of two witnesses.

LOUIS CAPUTO.

Witnesses:
CHARLES F. A. SMITH,
H. B. RUGGLES.